UNITED STATES PATENT OFFICE.

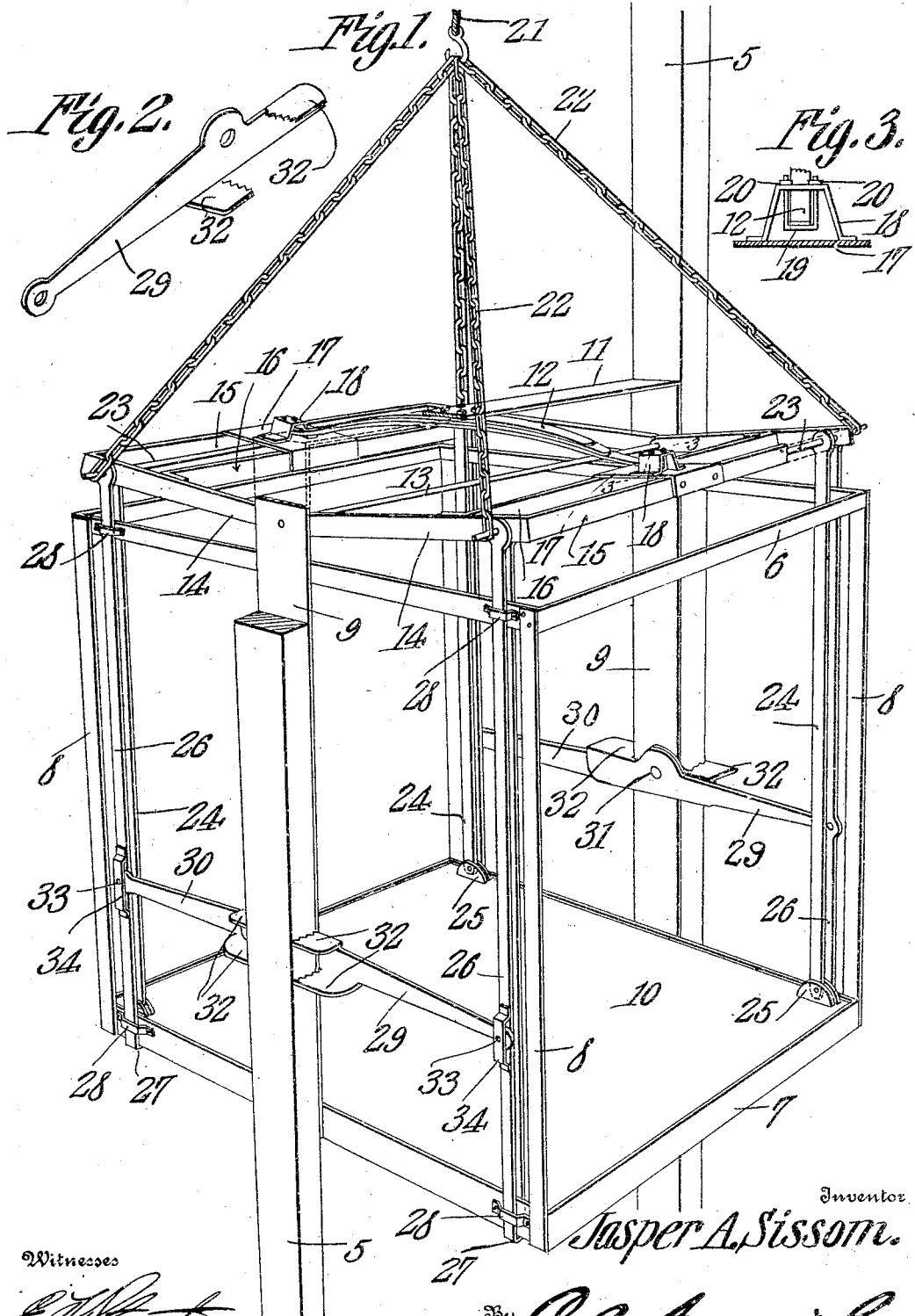

JASPER A. SISSOM, OF JOPLIN, MISSOURI, ASSIGNOR OF TWO-THIRDS TO JOHN W. BARKER, OF JOPLIN, MISSOURI.

ELEVATOR SAFETY DEVICE.

958,943.  Specification of Letters Patent.  Patented May 24, 1910.

Application filed March 3, 1909. Serial No. 481,213.

*To all whom it may concern:*

Be it known that I, JASPER A. SISSOM, a citizen of the United States, residing at Joplin, in the county of Jasper and State of Missouri, have invented a new and useful Elevator Safety Device, of which the following is a specification.

This invention relates to elevator safety devices of that type characterized by a clutch which is automatically operated to grip the guide strips between which the cage travels, when the hoisting cable breaks, whereby the descent of the cage is checked, it being securely locked to the guide strips.
The object of the present invention is to provide a safety device of this kind which is simple in structure, and reliable in operation, its parts being so arranged and constructed that the operation of the clutch is assured in case of breakage of the hoisting cable.

With the foregoing objects in view the invention consists in a novel construction and arrangement of parts to be hereinafter described and claimed, reference being had to the drawings hereto annexed in which:—

Figure 1 is a perspective view showing the application of the invention. Fig. 2 is a perspective view of one of the clutch members. Fig. 3 is a sectional detail on the line 3—3 of Fig. 1.

In the drawings, 5 denotes the usual vertical guide strips between which the load-sustaining member travels. Between the guide strips is also mounted a frame comprising top and bottom frame members 6 and 7, respectively, upright corner strips 8 and intermediate strips 9 connecting the same. The load-sustaining member is a platform 10 which is located within this frame at the bottom thereof. Said platform is not fastened to the frame but fits loosely therein, it being supported in a manner to be presently described. The strips 9 are located on opposite sides of the frame, and they are connected at their upper ends by a cross bar 11 to the under side of which is securely fastened a leaf spring 12. The upper ends of the strips 9 are connected by a cross rod 13 to which are hinged the suspension members of the platform. Each of said suspension members comprises side bars 14 pivotally mounted on the rod 13, and connected at their free ends by a cross bar 15.
Intermediate their ends, the bars 15 are also connected by transverse brace bars 16. The bars 15 and 16, intermediate their ends, carry a plate 17, said plate being rigidly secured to the bars. On the plates 17 are mounted supports for the free ends of the spring 12. Each of said supports comprises a plate which is bent into inverted U-shape, and is riveted or otherwise securely fastened to the plates 17. These plates 18 carry stirrups 19 into which the free ends of the spring extend. The two branches of the stirrups extend through the top of the plates 18 and the ends projecting from said plate are screw-threaded to receive fastening nuts 20. By adjusting these nuts the tension of the spring may be varied. The hoisting cable 21 is connected by chains or other suitable suspension devices 22 to the free ends of the hereindescribed suspension members, the connection being made with said members of each side thereof.

Adjacent to the free ends of the suspension members the bars 14 thereof are connected by cross rods 23 from which are suspended links 24 which are connected at their lower ends to the platform 10, whereby said platform is supported by the suspension members. On the platform are ears 25 to which the links are connected. The rods 23 also carry links 26 which have their lower ends turned inwardly as indicated at 27 to engage the bottom members 7 of the frame, whereby said frame is supported by the suspension members. On the top members 6 of the frame are guides 28 in which the links work. It will be seen from the foregoing that the links 24 form hangers for supporting the platform 10, and the links 26 serve as hangers for supporting the frame, said platform being thus supported by the suspension members.

On the strips 9 are mounted the clutch devices for engaging the guide strips 5. Each strip 9 carries a clutch device so that the guide strips may be engaged. The two clutch devices are identical in structure and a description of one will therefore suffice for both. Each clutch device comprises two levers 29 and 30, respectively, which are pivotally connected at one of their ends to the strips 9, the pivot 31 being common to both levers. The free end of the lever 29 extends in the direction of, and is connected to one of the links 26, and the lever 30 extends in the opposite direction and is connected to the other link 26. The pivoted ends of the levers are formed with jaws 32 which are in the form of upstanding flanges projecting from the edges of the lever. These flanges are spaced from each other sufficiently so that they may engage the guide strips on opposite sides, the edges of the flanges which are adapted to engage said strips, being serrated in order that a better hold may be had. The flanges of the respective levers are not in alinement, but are offset laterally with respect to each other, by reason of which said flanges will engage the guide strips at diagonally opposite points. The jaw flanges of one of the levers, however, are directly opposite the jaw flanges of the other lever. The jaws operate to clutch the side strips upon swinging the levers 29 and 30 on their pivots, the guide strips being gripped between the respective jaw flanges of the levers. By providing the two levers as hereindescribed, a double grip on the guide strips is had and when the clutch devices are actuated, the platform will be securely locked to the guide strips. The levers 29 and 30 are fastened to the links 26 by means of pins 33 passing through said parts, and also through straps 34 secured to the links, the lever extending between the said straps and the links.

The operation of the mechanism hereindescribed is as follows: The platform 10 is directly supported from the cable 21 through the suspension devices 22, and the links 24. The cross bars 15 and 16 form fulcrum or fixed points for the ends of the spring 22. The frame consisting of the members 6, 7, 8 and 9, is the supporting member of the clutch devices. When the inner pivots of the links 14 have been drawn down below the level of their outer ends, there is a toggle action of the links which would tend to further depress the supporting frame, and put the spring under tension by pulling down on its central portion. When the cable 21 breaks, the spring 12, will give a relative movement to the platform and the supporting member, sufficient to set the clutch devices.

What is claimed is:

1. The combination with the hoisting cable and guide strips of an elevator; of a frame, spring-supported suspension members hinged to the frame, to which members the hoisting cable is connected, hangers carried by the free ends of said suspension members, and loosely connected to the frame, clutch members operatively connected to the hangers and engageable with the guide strips, a platform loose in the frame, and a connection between said platform and the suspension members.

2. The combination with the hoisting cable and guide strips of an elevator; of a frame, spring supported suspension members hinged to the frame, to which members the hoisting cable is connected, hangers carried by the free ends of said suspension members, and loosely connected to the frame, clutch members operatively connected to the hangers, and engageable with the guide strips, a platform loose in the frame, and hangers carried by the free ends of the suspension members, and supporting the platform.

3. The combination with the hoisting cable and guide strips of an elevator; of a frame, suspension members hinged to the top of the frame, to the free ends of which members the hoisting cable is connected, a spring secured to the frame and bearing at its ends on the free ends of the suspension members, hangers carried by said ends of said members, and loosely connected to the frame, a platform carried by the suspension members, and clutch members operatively connected to the hangers, and engageable with the guide strips.

4. The combination with the hoisting cable and guide strips of an elevator; of a frame, suspension members hinged to the top of the frame, to the free ends of which members the hoisting cable is connected, a spring secured to the frame and bearing at its ends on the free ends of the suspension members, hangers carried by said ends of said members, and loosely connected to the frame, a platform carried by the suspension members, clutch members operatively connected to the hangers, and engageable with the guide strips, and means for adjusting the tension of the aforesaid spring.

5. The combination with the hoisting cable and guide strips of an elevator; of a frame, spring-supported suspension members hinged to the frame, to which members the hoisting cable is connected, hangers carried by the free ends of said suspension members and having inturned ends loosely engageable with the bottom of the frame, a platform carried by the suspension members, and clutch members operatively connected to the hangers, and engageable with the guide strips.

6. The combination with the hoisting cable and guide strips of an elevator; of a frame, suspension members hinged to the top of the frame, to the free ends of which members the hoisting cable is connected, a spring secured to the frame, stirrups adjustably secured to the free ends of the suspension members, and supporting the free ends of the spring, hangers carried by the free ends of said suspension members, and loosely connected to the frame, a platform carried by the suspension members, and clutch members operatively connected to the hangers, and engageable with the guide strips.

In testimony that I claim the foregoing as my own, I have hereto affixed my signature in the presence of two witnesses.

JASPER A. SISSOM.

Witnesses:
I. N. THRELKELD,
O. C. SISSOM.